United States Patent Office 3,476,452
Patented Nov. 4, 1969

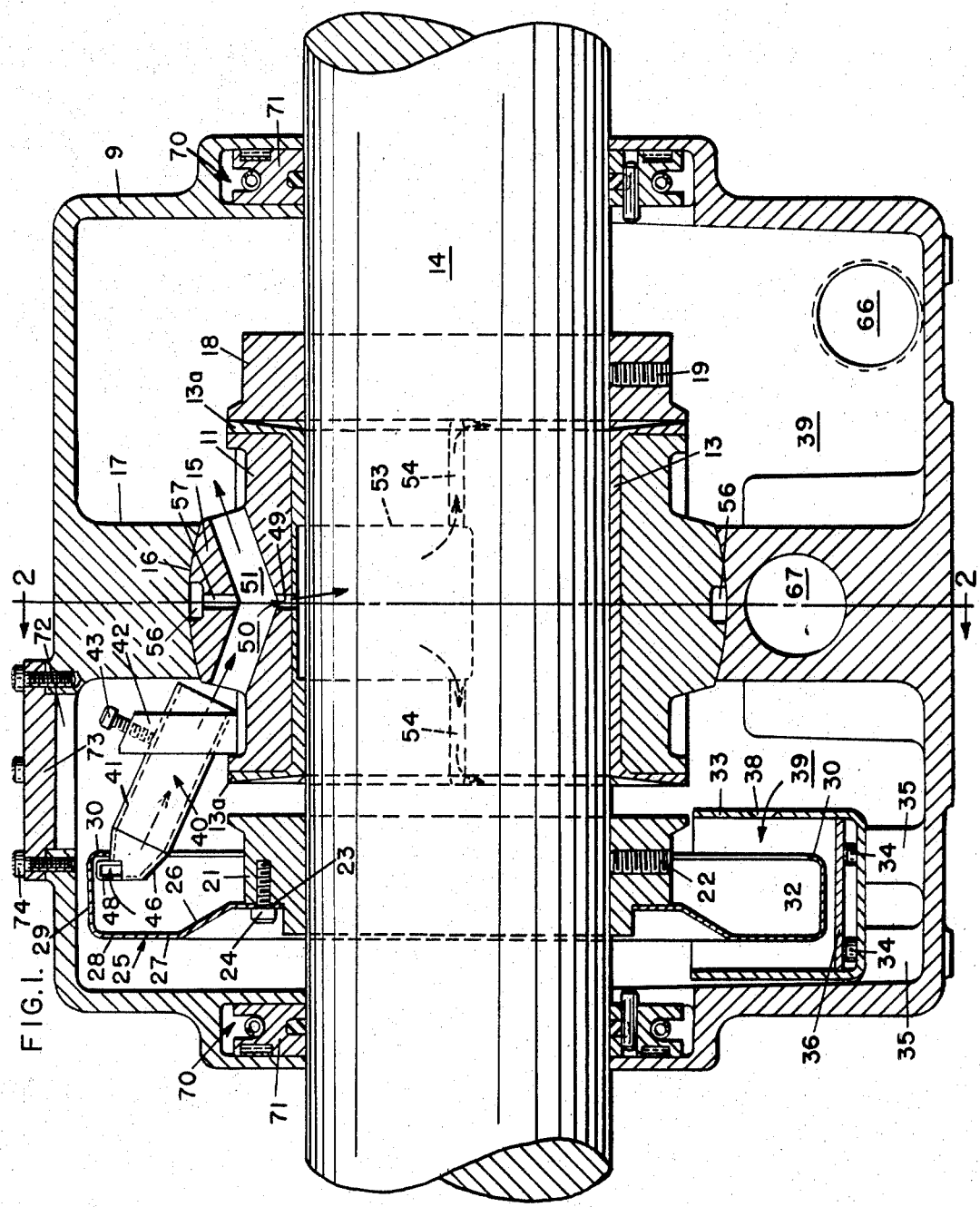

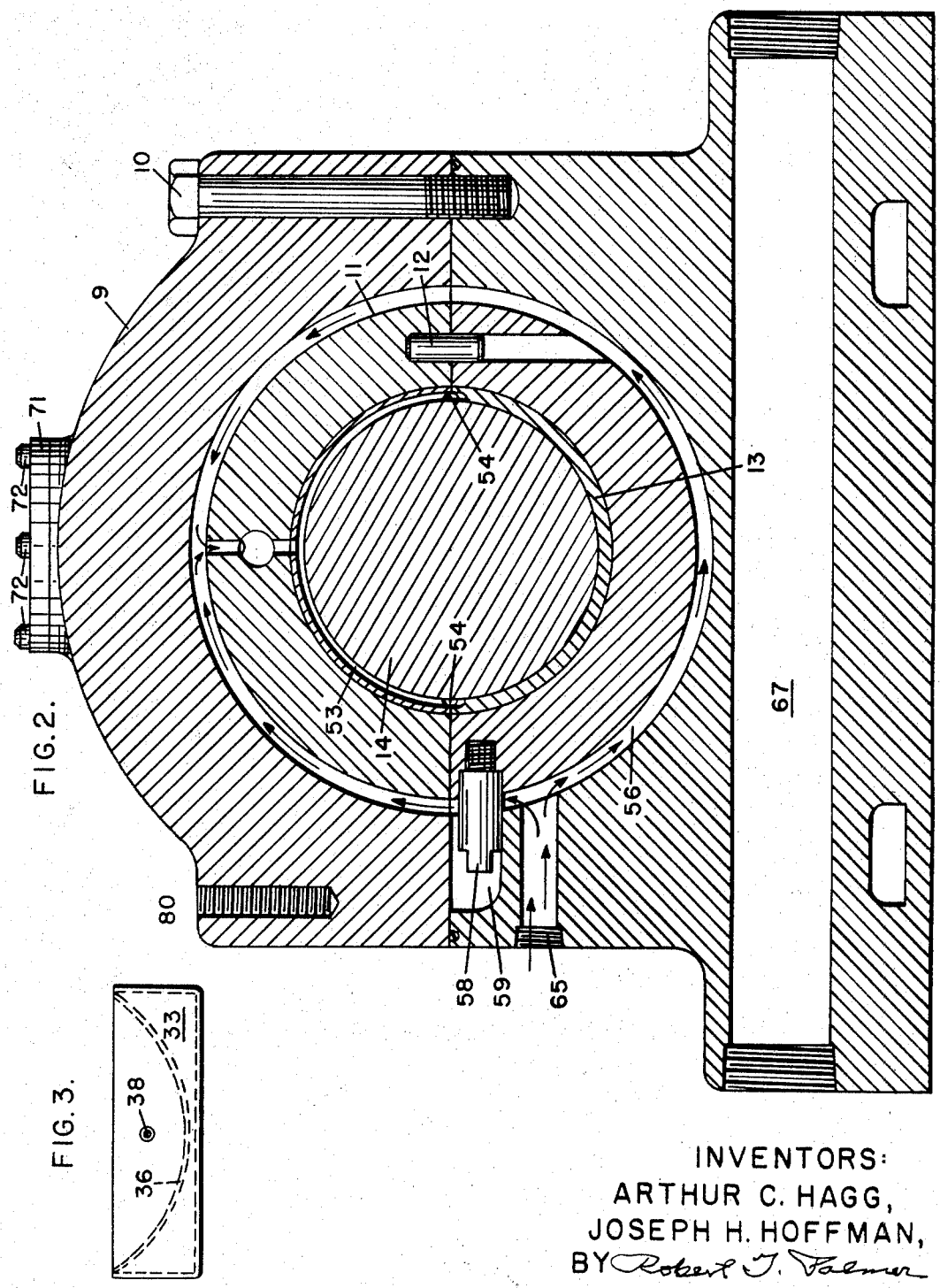

3,476,452
SLEEVE BEARINGS
Arthur C. Hagg, Pittsburgh, Pa., and Joseph H. Hoffman, Norwood, Mass., assignors to Westinghouse Electric Corporation, Pittsburgh, Pa., a corporation of Pennsylvania
Filed Jan. 15, 1968, Ser. No. 697,810
Int. Cl. F16n 7/20
U.S. Cl. 308—127                              14 Claims

ABSTRACT OF THE DISCLOSURE

A bearing has thrust collars attached to a shaft adjacent to the ends of a sleeve extending around a shaft with a babbitt layer between the shaft and the sleeve. One of the collars has a drum attached thereto, the drum having an inturned edge forming a trough, the bottom of which rotates within a chamber separated except for an orifice, from the oil sump of the bearing. A scoop above the top of the adjacent end of the sleeve extends into the trough and conveys oil therefrom into passages connecting with an annular distribution chamber extending half-way around the top of the shaft. The distribution chamber is connected by slots in the babbitt layer to the ends of the sleeve.

FIELD OF THE INVENTION

The field of the invention is sleeve bearings for centrifugal fans which may be required to handle heated gases at temperatures as high as 900° F., so that large amounts of oil are required for lubrication and for cooling.

SUMMARY OF THE INVENTION

A bearing has thrust collars attached to a shaft adjacent to the ends of a sleeve extending around the shaft with a babbitt layer between the shaft and the sleeve, and supporting the shaft. One of the collars has a drum extending therearound and attached thereto. The drum has an inturned edge forming an annular trough, the bottom of which rotates within a chamber separated except for an orifice, from the oil sump of the bearing. An oil scoop above the adjacent end of the sleeve extends into the top of the trough, and conveys oil through passages within the sleeve into an annular distribution chamber extending halfway around the shaft at its top. A passage within the upper portion of the sleeve directs excess oil over the exterior of the sleeve for aiding in cooling the latter. An annular passage extends around the center of the sleeve, and connects with the other oil passages, and with inlet and outlet passages within the housing, for connection to an external oil source.

BRIEF DESCRIPTION OF THE DRAWINGS

FIG. 1 is a side view, in section, of a bearing embodying this invention;

FIG. 2 is a section along the lines 2—2 of FIG. 1, and

FIG. 3 is a side view of the chamber within the oil sump shown by FIG. 1, on a reduced scale.

DESCRIPTION OF THE PREFERRED EMBODIMENT OF THE INVENTION

A bearing housing 9 has upper and lower parts connected together by bolts 10, one of which is shown by FIG. 2. The housing 9 extends around a sleeve 11 having upper and lower halves connected together by a dowel 12. The inner surface of the sleeve 11 has a thin layer 13 of bearing metal in contact therewith. The bearing metal layer 13 is formed in upper and lower halves, and extends around and supports a shaft 14. The layer 13 has radially outwardly extending portions 13a in contact with the ends of the sleeve 11. The sleeve 11 has a central, radially outwardly extending portion 15 having a partispherical surface 16 in contact with a mating surface on the inner end of central, radially inwardly extending portion 17 of the housing 9. The mating surfaces extend 360° around the sleeve 11, and permit the latter to adjust to the position of the shaft 14. A thrust collar 18 is attached by screw 19 to the shaft 14 opposite the right end (facing FIG. 1) of the sleeve 11. A thrust collar 21 is attached by screw 22 to the shaft 14 opposite the left end of the sleeve 11. The collar 21 has a radially extending shoulder 23 to which is attached by screws 24 the inner edge portion of drum 25 which extends radially and axially outwardly from where it is attached to the shoulder 23; has a portion 27 which extends radially outwardly from the portion 26; has a cylindrical portion 29 which extends axially inwardly from the portion 27, and has a portion 30 which extends a short distance radially inwardly from the portion 28. The drum portions 27, 28 and 29 form a trough 32, the lower portion of which rotates within a chamber 33, the bottom of which is attached by screws 34 to flanges 35 extending upwardly from the bottom of the housing 9. A sheet 36 formed in an arc of a circle concentric with the drum 25 extends across the interior of the chamber 33 below the drum 25 and above the screws 34. The chamber 33 has in its right wall an orifice 38 connecting the interior of the chamber 33 with oil sump 39 in the bottom of the housing 9, the chamber 33 being located within this sump 39.

An oil scoop 40 has a cylindrical portion 41 extending at about an angle of 30° to the axis of the shaft 14, and the inner portion of which is held in clamp 42 by screw 43. The clamp 42 is attached to the top of the sleeve 11. The outer end of the scoop 40 extends into the trough 32 at the top of the drum 25; has a converging outer portion 46, and has at the top of the latter a rectangular oil inlet opening 48 extending in a vertical plane parallel to the axis of the shaft 14, and facing the direction of rotation of the shaft 14 and the drum 25.

The upper portion of the sleeve portion 15 has a passage 50 therein extending at about an angle of 30° to the axis of the shaft 14, with its inlet end adjacent to, aligned with, and spaced from the outlet end of the scoop 40. The outlet end of the passage 50 connects with the top of a vertical passage 49 in the longitudinal center of the upper portion of the sleeve 11. The sleeve portion 15 has a passage 51 therein extending at about an angle of 30° to the axis of the shaft 14, from the top of the passage 49 to the exterior of the sleeve 11 adjacent to the top of its right end. The passage 49 extends from the junction of the passages 50 and 51 into an annular oil distribution chamber 53 formed by removing the inner surface of the bearing layer 13 around the upper portion of the shaft 14 on opposite sides of the longitudinal center of the sleeve 11. The chamber 53 connects at its bottom with horizontally extending passages 54 formed within the bearing layer 13, and which extend to the ends of the sleeve 11. The sleeve portion 15 has an annular slot 56 extending inwardly from the center of its partispherical surface 16, 360° around the sleeve 11, and which connects with a vertical passage 57 which connects with the junction of the passages 50, 51 and 49.

As shown by FIG. 2, a pin 58 is threaded into the lower portion of the sleeve 11, and extends into a recess 59 in the lower portion of the housing 9, and the bottom of which contacts the bottom of the recess 59. The shaft 14 rotates in a counterclockwise direction with respect to FIG. 2, and the pin 58 prevents rotation of the sleeve 11.

The lower portion of the housing 9 has an oil inlet passage 65 below the pin 58, and has an oil outlet passage 66 connecting with the oil sump. The inner end of the passage 65 connects with the annular slot 56. The passages 65 and 66 are for connection through a valve (not shown) to an external oil source (not shown). The lower portion of the housing 9 has a passage 67 extending therethrough for connection to a source of cooling fluid (not shown).

As shown by FIG. 2, a threaded opening 68 is provided in the top of the housing 9 for receiving a threaded rod used to lift the housing.

As shown by FIG. 1, the housing 9 has recesses 70 within its ends within which are supported conventional oil seals 71 around and in contact with the shaft 14. The housing 9 has an opening 72 in its top above the scoop 40 for providing access to the latter. The opening 72 is covered by a plate 73 attached by screws 74 to the top of the housing 9.

OPERATION

When the shaft 14 is at rest, oil from the sump 39 flows through the orifice 38 into the chamber 33 supplying oil into the latter to the level of the oil within the sump. When the shaft 14 starts to rotate, the drum 25 rotates, and oil is carried from the chamber 33 by the trough 32 to the scoop 40 which picks off the oil and supplies it through the passages 50 and 49 into the oil distribution chamber 53 from which the oil is supplied onto the surface of the shaft 14, and through the passages 54 to the ends of the sleeve 11. Excess oil over that required for lubrication and cooling, flows from the outlet of the scoop 40 into the space between the latter and the inlet to the passage 50, and over the surface of the left end portion of the sleeve 11, and flows from the passage 50 into the passage 51, from the outlet of the latter, excess oil flows over the surface of the right end portion of the sleeve 11, the excess oil aiding in the cooling of the bearing.

When the operating temperature is relatively low, the thrust collars are located as shown by FIG. 1, with the axially inner surface of the collar 18 in contact with the adjacent bearing layer portion 13a, and with the axially inner surface of the collar 21 spaced from the adjacent bearing layer portion 13a. When the operating temperature becomes relatively high, the shaft 14 moves to the right so that the axially inner surface of the thrust collar 21 moves against the adjacent bearing layer portion 13a, and the axially inner surface of the thrust collar 18 moves away from the adjacent bearing layer portion 13a. At this time, the drum 25 moves to the right, but it and the scoop 40 are so arranged and shaped, and the trough 32 has sufficient width, for the drum 27 to clear the upper end of the scoop 40 during the axial movement of the drum 25.

In conventional bearings having drums with troughs for oil pick up, as disclosed in the U.S. Patents Nos. 1,921,339; 2,241,870 and 2,736,622, the drums rotate with their lower portions in contact with the oil within the associated oil sumps. This can be done effectively at low drum speeds, but we have found that at relatively high drum speeds within the operating ranges of centrifugal fans for which the present bearing was designed, the drums when rotating with their lower portions in contact with the oil within the sumps, cut, in effect, channels within the oil, throwing up oil on each side of the channels so that insufficient oil for adequate lubrication and cooling enters the troughs. With our construction, using the chamber 33 for the lower portion of the drum 25 to rotate in, at relatively high drum speeds, oil from the sump 39 flows in a jet through the orifice 38 into the trough 32, filling the latter so that adequate oil is supplied into the scoop 40.

A fan equipped with bearings embodying this invention may be required to handle gases having such high temperatures that, at times, extra oil from an external source may be required. At such times, oil from an external source is supplied under pressure into the passage 65 from which it enters the annular passage 56 from which it flows through the passages 57 and 49 into the annular distribution chamber 53, and from the latter in contact with the shaft 14, and through the passages 54 to the thrust ends of the sleeve 11, into the sump 39 from which it is returned through the passage 66 to the external source.

When required, a cooling fluid such for example, as air or water may be supplied from an external source through the passage 67 for providing additional cooling of the bearing.

We claim:

1. A bearing comprising a housing having an oil sump in its bottom, a layer of bearing metal around a shaft, a sleeve around said layer, said layer having radially outwardly extending portions at the ends of said sleeve, means forming a chamber within said sump at said one end of said sleeve, said chamber having an orifice connecting with said sump, a thrust collar attached to said shaft at said one end of said sleeve, a drum attached to and extending around said collar concentric with said shaft, said drum having an annular trough extending into the interior of said chamber, another thrust collar attached to said shaft at the other end of said sleeve, an oil scoop supported above said one end of said sleeve and having an oil inlet extending into said trough, said scoop sloping downwardly from said inlet and having its oil outlet above said sleeve, said sleeve having an oil passage with an oil inlet aligned with said outlet, said passage sloping downwardly from its said inlet and having its oil outlet adjacent to the longitudinal center of said sleeve, an annular oil distribution chamber formed in said layer on both sides of the center of said sleeve and extending around the upper portion of said shaft, said sleeve having a vertical oil passage connecting said distribution chamber and said oil outlet of said first mentioned passage, and horizontally extending passages formed in said layer on opposite sides of said shaft connecting said distribution chamber with said ends of said sleeve.

2. A bearing as claimed in claim 1 in which said sleeve has an excess oil passage having its inlet connected to the junction of said first mentioned and vertical passages and sloping upwardly therefrom and having its outlet above said sleeve adjacent to said other end of said sleeve.

3. A bearing as claimed in claim 1 in which said sleeve has an annular passage extending 360° around said sleeve at its longitudinal center, in which said sleeve has a vertical passage connecting said annular passage and said junction, and in which there are oil inlet and outlet passages in said housing for connection to an external oil source, said inlet passage being connected to said annular passage, and said outlet passage being connected to said sump.

4. A bearing as claimed in claim 3 in which said sleeve has therein an excess oil passage having its oil inlet connected to the junction of said first mentioned passage and said first mentioned vertical passage, and having its oil outlet above said sleeve adjacent to said other end of said sleeve.

5. A bearing as claimed in claim 4 in which said chamber within said sump has means forming a surface curved in a circular arc concentric with said drum, extending across the interior of said last mentioned chamber below said drum.

6. A bearing as claimed in claim 3 in which said chamber within said sump has means forming a surface curved in a circular arc concentric with said drum, extending across the interior of said last mentioned chamber below said drum.

7. A bearing as claimed in claim 1 in which said chamber within said sump has means forming a surface curved in a circular arc concentric with said drum. extending across the interior of said last mentioned chamber below said drum.

8. A bearing as claimed in claim 7 in which said sleeve is supported from said housing through having a radially outwardly extending portion at its longitudinal center with a parti-spherical surface contacting a mating surface on a radially inwardly extending portion of said housing.

9. A bearing comprising a housing having an oil sump in its bottom, a sleeve supportted by said housing around a shaft, a layer of bearing metal around said shaft between said sleeve and said shaft, said layer having portions extending radially outwardly at the ends of said sleeve, thrust collars attached to said shaft adjacent to said ends of said sleeve, a drum around and concentric with said shaft on one of said collars, means forming a chamber within said sump below said one collar, said chamber having an orifice connecting with said sump, said drum having an annular trough extending into the interior of said chamber, an oil scoop extending into said trough above said one collar, and means for conducting oil from said scoop to the surface of said shaft within said sleeve and to said ends of said sleeve.

10. A bearing as claimed in claim 9 in which said means for conducting oil includes an annular oil distribution chamber formed in said layer above the upper portion of said shaft.

11. A bearing as claimed in claim 10 in which there is provided in said sleeve an annular oil passage extending 360° around said sleeve at its longitudinal center and connecting with said annular chamber, and in which there are provided in said housing, oil inlet and outlet passages for connection to an external oil source, said inlet passage connecting with said annular passage, and said outlet passage connecvting with said sump.

12. A bearing as claimed in claim 10 in which said sleeve is supported from said housing through having a radially outwardly extending portion at its longitudinal center with a parti-spherical surface contacting a mating surface on a radially inwardly extending portion of said housing.

13. A bearing as claimed in claim 10 in which said chamber within said sump has means forming a surface curved in a circular arc concentric with said drum, extending across the interior of said last mentioned chamber below said drum.

14. A bearing as claimed in claim 9 in which said chamber within said sump has means forming a surface curved in a circular arc concentric with said drum, extending across the interior of said last mentioned chamber below said drum.

References Cited
UNITED STATES PATENTS

| | | | |
|---|---|---|---|
| 1,064,520 | 6/1913 | Moore | 308—127 |
| 1,657,349 | 1/1928 | Eisenhauer | 308—127 |
| 2,023,764 | 12/1935 | Howarth | 308—127 |
| 2,651,553 | 9/1953 | Simonis et al. | 308—127 |

EDGAR W. GEOGHEGAN, Primary Examiner

F. SUSKO, Assistant Examiner

U.S. Cl. X.R.

308—245